United States Patent [19]

Kawamura et al.

[11] Patent Number: 5,719,987
[45] Date of Patent: Feb. 17, 1998

[54] PHOTOGRAPHING-MODE-DEPENDENT IMAGE DATA RECORDING METHOD IN A DIGITAL CAMERA USING HIERARCHICAL STORAGE TO RECORD STILL IMAGES AT A DIFFERENT LEVEL THAN SEQUENTIAL IMAGES

[75] Inventors: Koichiro Kawamura, Chiba-ken; Takao Ikuma, Mito, both of Japan

[73] Assignee: Nikon Corporation, Tokyo, Japan

[21] Appl. No.: 662,285

[22] Filed: Jun. 12, 1996

Related U.S. Application Data

[63] Continuation of Ser. No. 372,856, Jan. 13, 1995, abandoned, which is a continuation of Ser. No. 161,480, Dec. 6, 1993, abandoned.

[30] Foreign Application Priority Data

Dec. 8, 1992  [JP]  Japan ................ 4-327943
Nov. 11, 1993  [JP]  Japan ................ 5-282309

[51] Int. Cl.$^6$ ............... H04N 5/225; H04N 5/76; H04N 5/91; H04N 9/64
[52] U.S. Cl. ............... 386/120; 348/220; 348/716
[58] Field of Search ............... 358/335, 310, 358/906, 342, 908.1; 360/33.1, 35.1; 348/207, 220, 232, 231, 233, 714–716, 717; 386/38, 120, 121; H04N 5/76, 5/78, 5/781, 5/782, 5/783, 5/912, 5/225, 9/79

[56] References Cited

U.S. PATENT DOCUMENTS

| | | | |
|---|---|---|---|
| 4,574,319 | 3/1986 | Konishi | 358/335 |
| 4,982,291 | 1/1991 | Kurahashi | 358/335 |
| 5,034,804 | 7/1991 | Sasaki et al. | 358/335 |
| 5,130,813 | 7/1992 | Oie et al. | 358/335 |
| 5,229,862 | 7/1993 | Takahashi et al. | 358/335 |
| 5,353,121 | 10/1994 | Young et al. | 348/563 |

FOREIGN PATENT DOCUMENTS

4-335784  11/1992  Japan.

*Primary Examiner*—Tommy P. Chin
*Assistant Examiner*—David R. Vincent
*Attorney, Agent, or Firm*—Shapiro and Shapiro

[57] ABSTRACT

An image data recording method in a digital still video camera capable of selecting one of the single shot mode for photographing and recording only a single image and the sequential shot mode for sequentially photographing and recording a plurality of images comprises the steps of distinguishing whether a recorded image was photographed in the single shot mode or in the sequential shot mode, giving a file name correspondingly to the photographed image, and recording the photographed image. File names for each single shot image may be stored at a given hierarchy level. A name (e.g., a subdirectory name) representative of a plurality of sequential shot images may be stored at the same level as the single shot file names and file names of the sequential shot images stored under the representative name at a different hierarchy level.

2 Claims, 9 Drawing Sheets

PHOTOGRAPHING-MODE-DEPENDENT IMAGE DATA RECORDING METHOD IN A DIGITAL CAMERA USING HIERARCHICAL STORAGE TO RECORD STILL IMAGES AT A DIFFERENT LEVEL THAN SEQUENTIAL IMAGES

This is a continuation of application Ser. No. 08/372,856 filed Jan. 13, 1995, which is a continuation of application Ser. No. 08/161,480 filed Dec. 6, 1993, both now abandoned.

BACKGROUND OF THE INVENTION

1. Field of the Invention

This invention relates to an image data recording method in a digital still video camera.

2. Related Background Art

Figure 6:
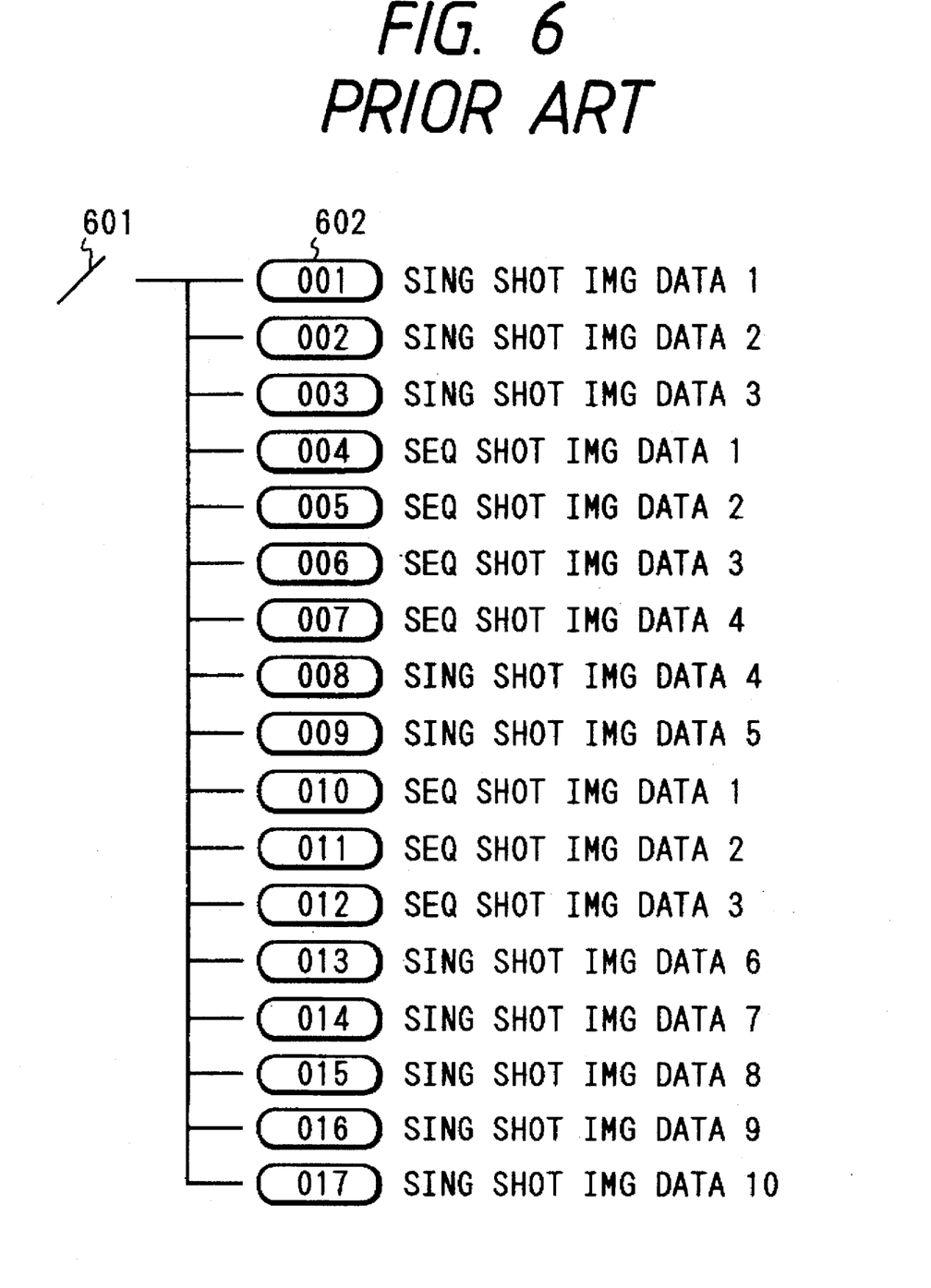
FIG. 6 is a conceptual diagram showing an example of the file structure of the image data recording method in the digital still video camera according to the prior art.

In digital still video cameras, it has heretofore been practiced to utilize the file format of a versatile operating system to record photographed digital image data on a recording medium such as a memory card. In the prior-art apparatus of this kind, photographed digital image data are successively recorded with file names given to the interior of a root directory. In FIG. 6 of the accompanying drawings, there is shown an example of the image data recording method according to the prior art.

In FIG. 6, the reference numeral 601 designates a root directory, and the reference numeral 602 denotes examples of file names.

The prior-art apparatus has been such that all image data are stored in one and the same directory. Also, a technique of including a character for distinguishing between a single shot and a sequential shot in some of file names is disclosed in Japanese Laid-Open Patent Application No. 4-335784.

In the above-described prior art, however, the file of all image data is stored in the root directory, and this has led to a problem that it is difficult to look for a particular file.

Also, the prior art has been such that the file name is used to only distinguish between a single shot and a sequential shot. However, a digital still video camera is also provided with a plurality of photographing modes, and it is desired not only to distinguish between a single shot and a sequential shot, but also to distinguish between the other photographing modes similarly. For that purpose, it is possible to include characters or the like representing the information of those photographing modes in some of file names. This would give rise to a problem that the number of the characters of the file names will become very great and exceed the limit of the number of the characters of the file names or even if one sees the file name, one could not judge in a moment in what photographing mode the image data have been photographed.

SUMMARY OF THE INVENTION

It is an object of the present invention to provide a method of putting the files of image data in order so that they can be readily seen, and enabling a plurality of photographing modes to be judged without the files being opened even when images have been photographed in the plurality of photographing modes.

To achieve this object, according to the present invention, in an image data recording method in a digital still video camera having a plurality of photographing modes, a subdirectory for storing therein the files of image data photographed by the camera may be prepared, and only the file of image data photographed in at least one of said plurality of photographing modes may be stored in said subdirectory.

In the image data recording method in the digital still video camera of the above-described construction a subdirectory may be prepared and only the file of image data photographed in at least one of a plurality of photographing modes may be stored therein. Therefore, the files of image data are put in a more easily manageable order. Also, in what photographing mode the image data were photographed can be judged.

DESCRIPTION OF THE PREFERRED EMBODIMENTS

Some embodiments of the present invention will hereinafter be described with reference to the drawings.

Figure 1:
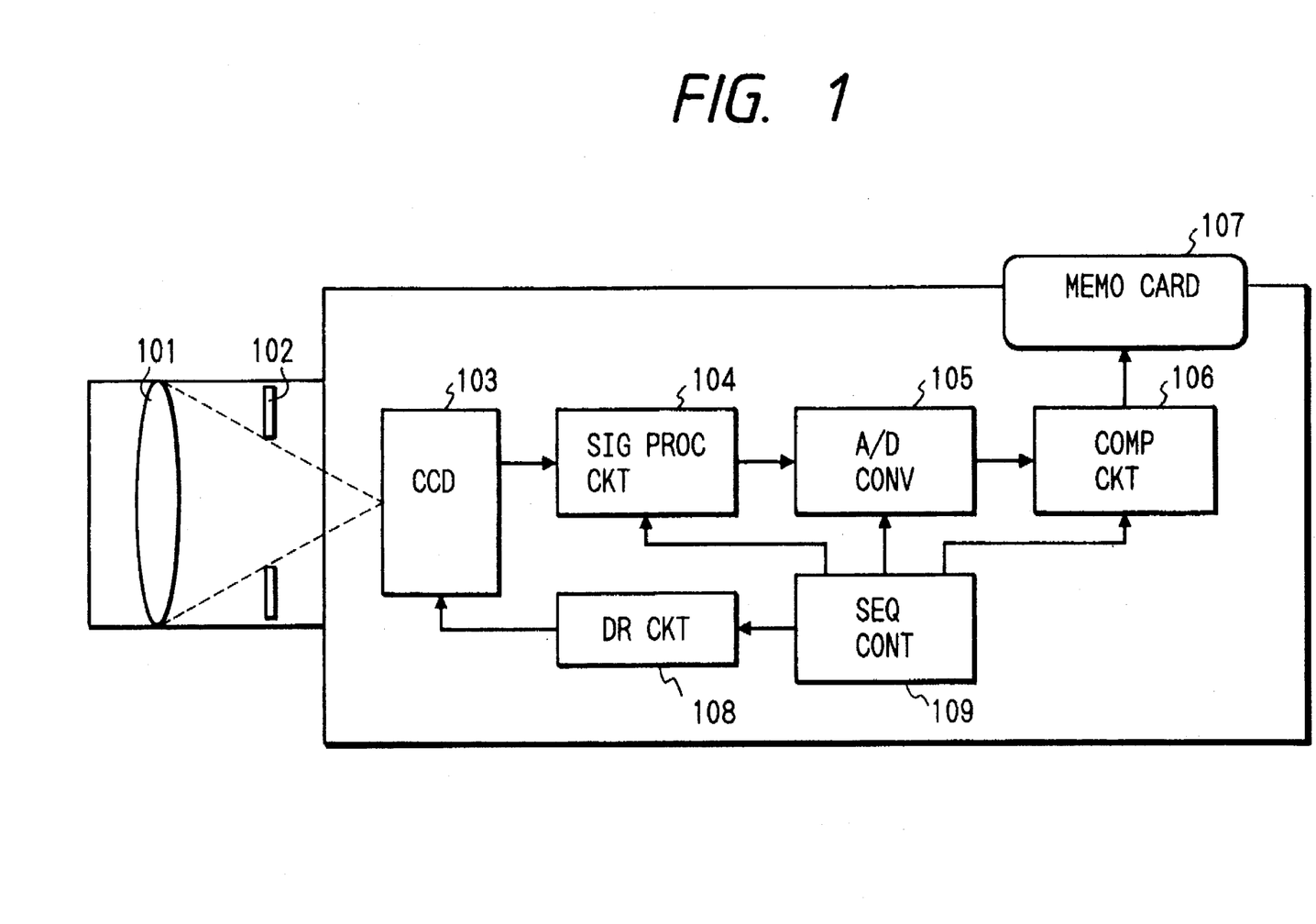
FIG. 1 is a block diagram showing an embodiment of an image data recording method in a digital still video camera according to the present invention.

FIG. 1 is a block diagram showing an embodiment of the image data recording method in the digital still video camera according to the present invention. Herein, it is to be understood that characters or characters expressed as character rows include numerals or symbols.

In FIG. 1, light passed through a lens 101 is controlled to a proper quantity of light by a, stop 102 and a shutter (not shown) and is photoelectrically converted by a CCD 103 driven by a driving circuit 108. The output image signal of the CCD 103 is subjected to signal processing such as γ correction by a signal processing circuit 104 and is processed into an image signal. The output of the signal processing circuit 104 is A/D-converted by an A/D converting circuit 105 and becomes a digital image signal, which is data-compressed by a compressing circuit 106, whereafter it is recorded on a memory card 107 by the file format of a versatile operating system with data of an image as one file. A sequence control unit 109 supplies a signal necessary in each of the above-described blocks and performs the control of a series of operations.

Figure 2:
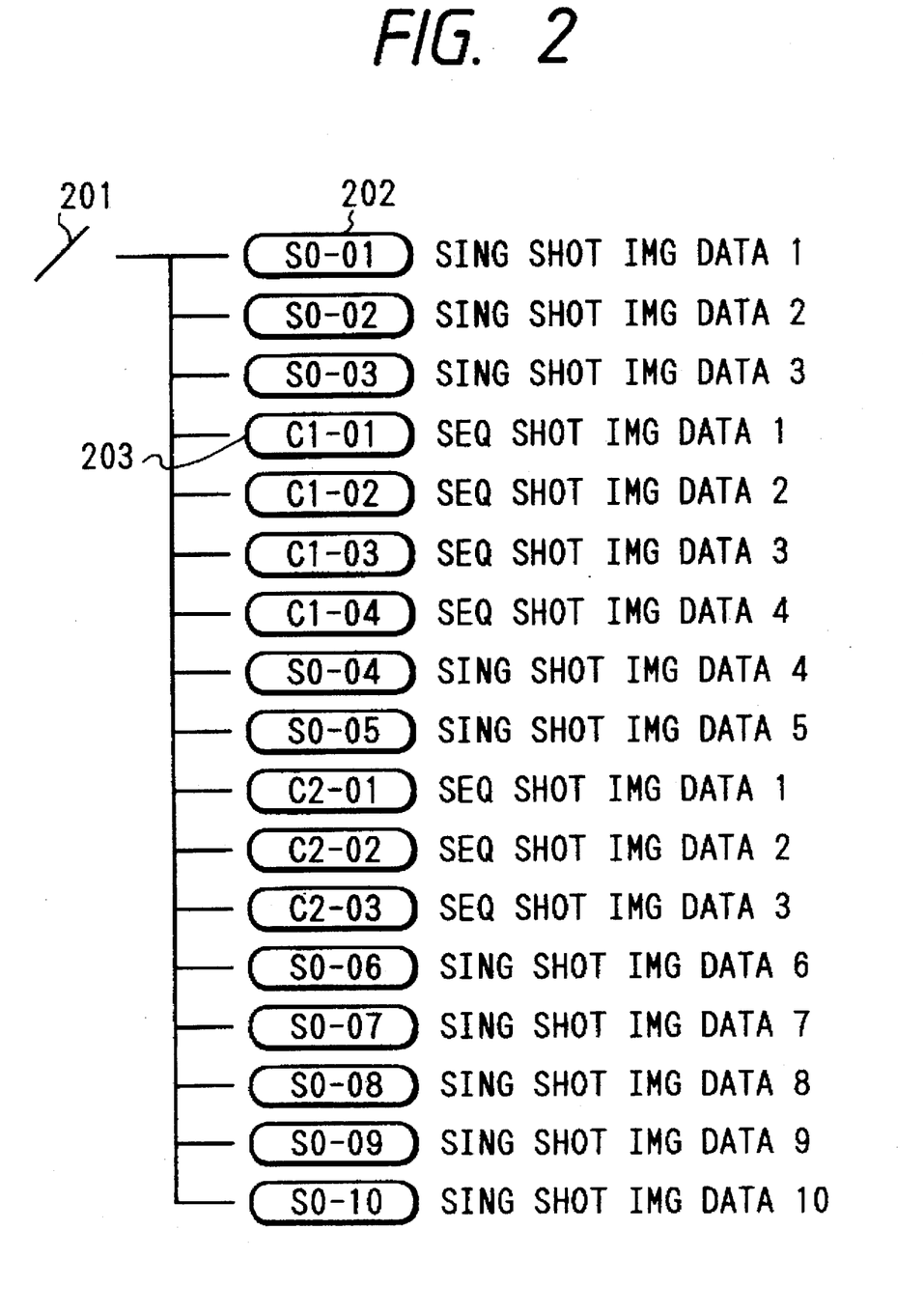
FIG. 2 is a conceptual diagram showing the file structure of the image data recording method in the digital still video camera according to a first embodiment of the present invention.

FIG. 2 shows a first embodiment of the file structure of the image data recording method in the digital still video camera according to the present invention.

In FIG. 2, the reference numeral 201 designates a root directory. The reference numeral 202 denotes an example of the file names of single shot image data, and the reference numeral 203 designates an example of the file names of sequential shot image data. In this embodiment, the file names of single shot image data are consecutive numbers beginning with S, and the file names of sequential shot image data are consecutive numbers beginning with C. Particularly, the file names of sequential shot image data represent a continuous relation by making branch numbers into consecutive numbers.

Figure 3:
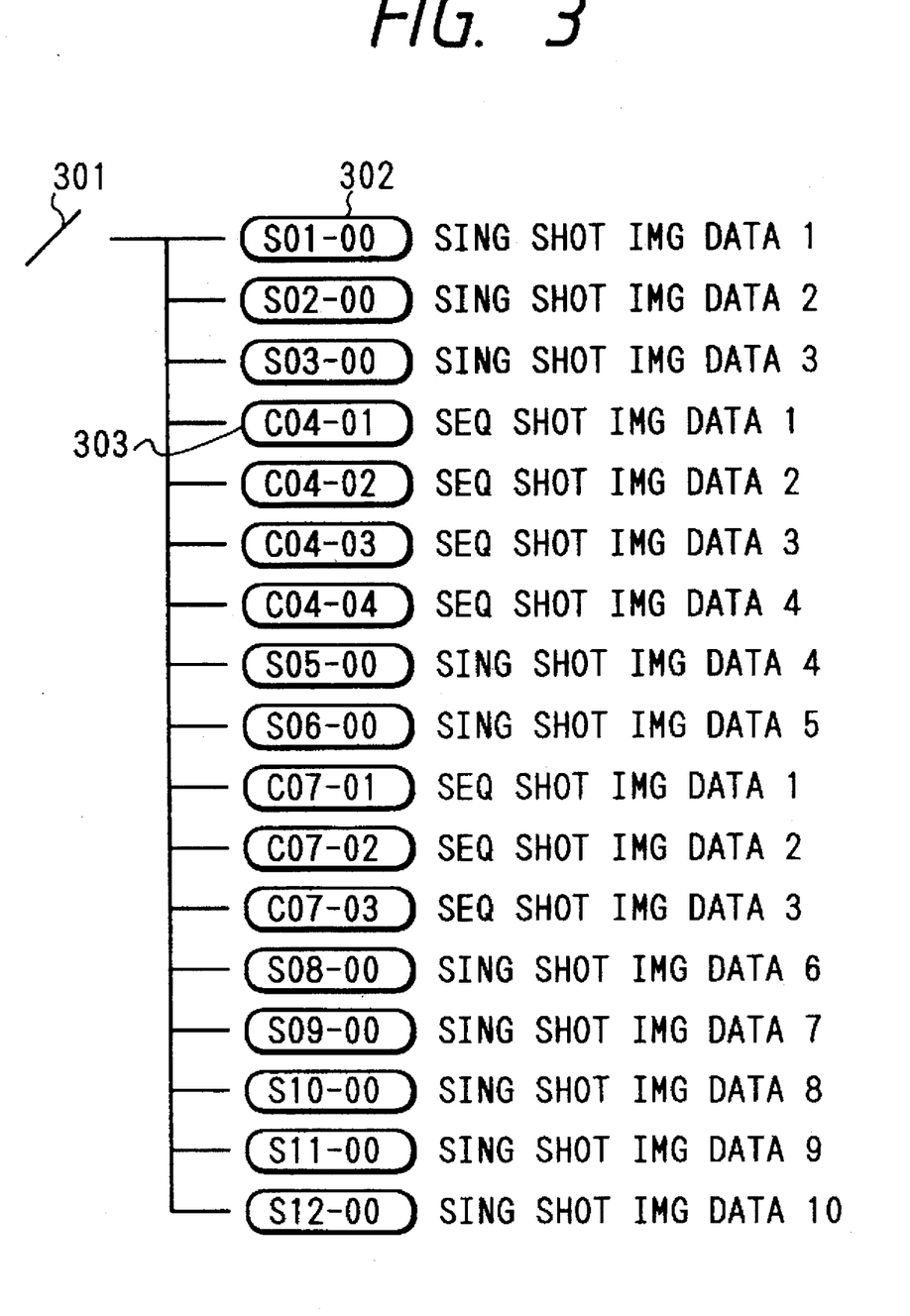
FIG. 3 is a conceptual diagram showing the file structure of the image data recording method in the digital still video camera according to a second embodiment of the present invention.

FIG. 3 shows a second embodiment of the file structure of the image data recording method in the digital still video camera according to the present invention.

In FIG. 3, the reference numeral 301 denotes a root directory, and the reference numeral 302 designates an example of the file names of single shot image data. The reference numeral 303 denotes an example of the file names of sequential shot image data. In this embodiment, the file names of single shot image data are consecutive numbers beginning with S, and the file names of sequential shot image data are consecutive numbers beginning with C. This embodiment is similar to the embodiment of FIG. 2 in that the file names of sequential shot image data represent a continuous relation by making branch numbers into consecutive numbers, but differs from the embodiment of FIG. 2 in that the branch numbers of the file names of single shot image data are fixed to "00" so as to be readily distinguished from the sequential shot image data.

Figure 4:
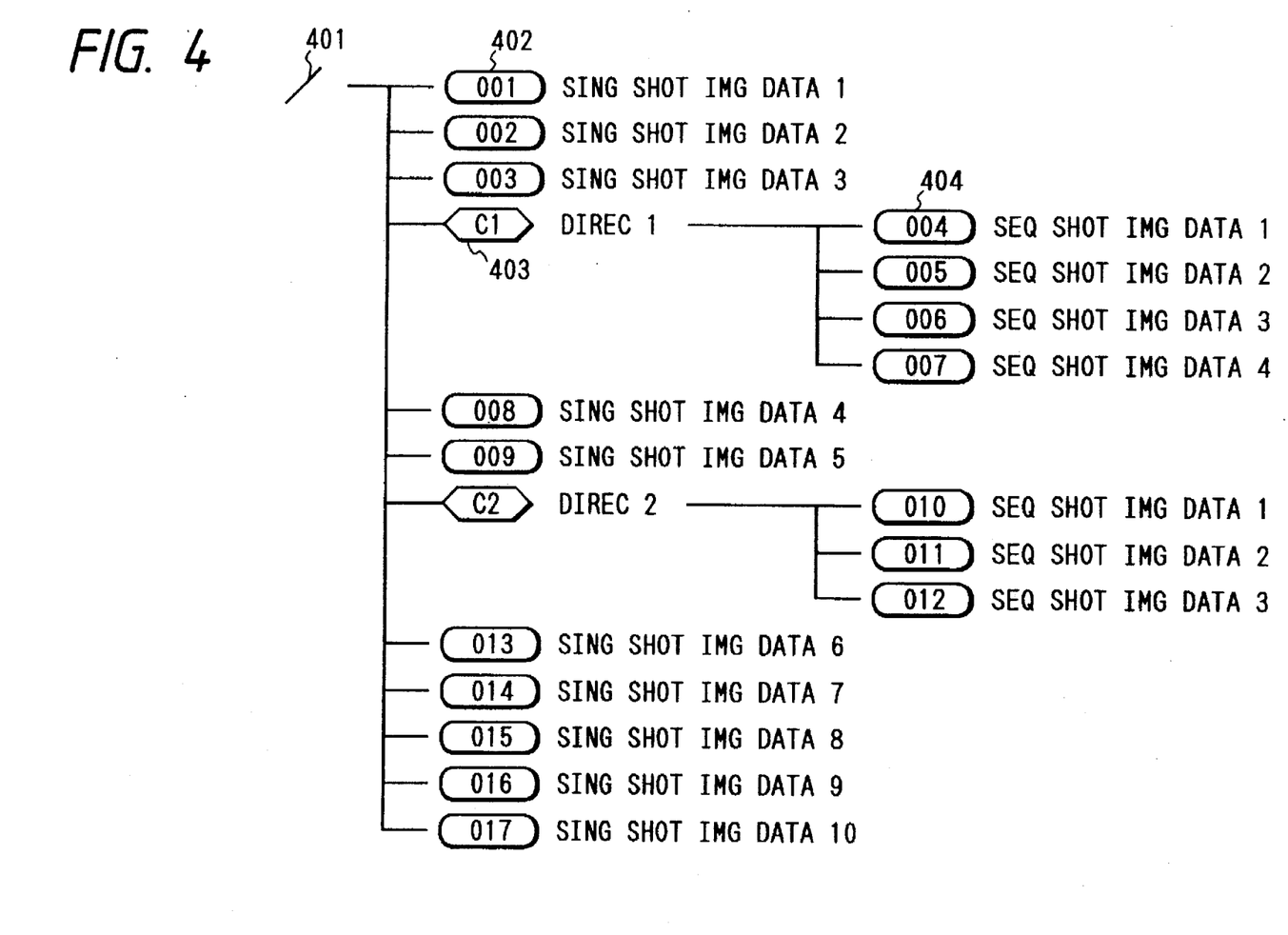
FIG. 4 is a conceptual diagram showing the file structure of the image data recording method in the digital still video camera according to a fourth embodiment of the present invention.

FIG. 4 shows a third embodiment of the file structure of the image data recording method in the digital still video camera according to the present invention.

In FIG. 4, the reference numeral 401 designates a root directory, and the reference numeral 402 denotes an example of the file names of single shot image data. The reference numeral 403 designates the directory name of a subdirectory made under the root directory. The directory name of the subdirectory is comprised of consecutive numbers beginning with C. Sequential shot image data are stored in the subdirectory, and the reference numeral 404 denotes an example of the file names of sequential shot image data, and the file names are comprised of consecutive numbers of three figures. In this embodiment, the file of single shot image data is made under the root directory and the file of sequential shot image data is made under the subdirectory made under the root directory, whereby the single shot image data and the sequential shot image data are distinguished from each other.

Figure 5:
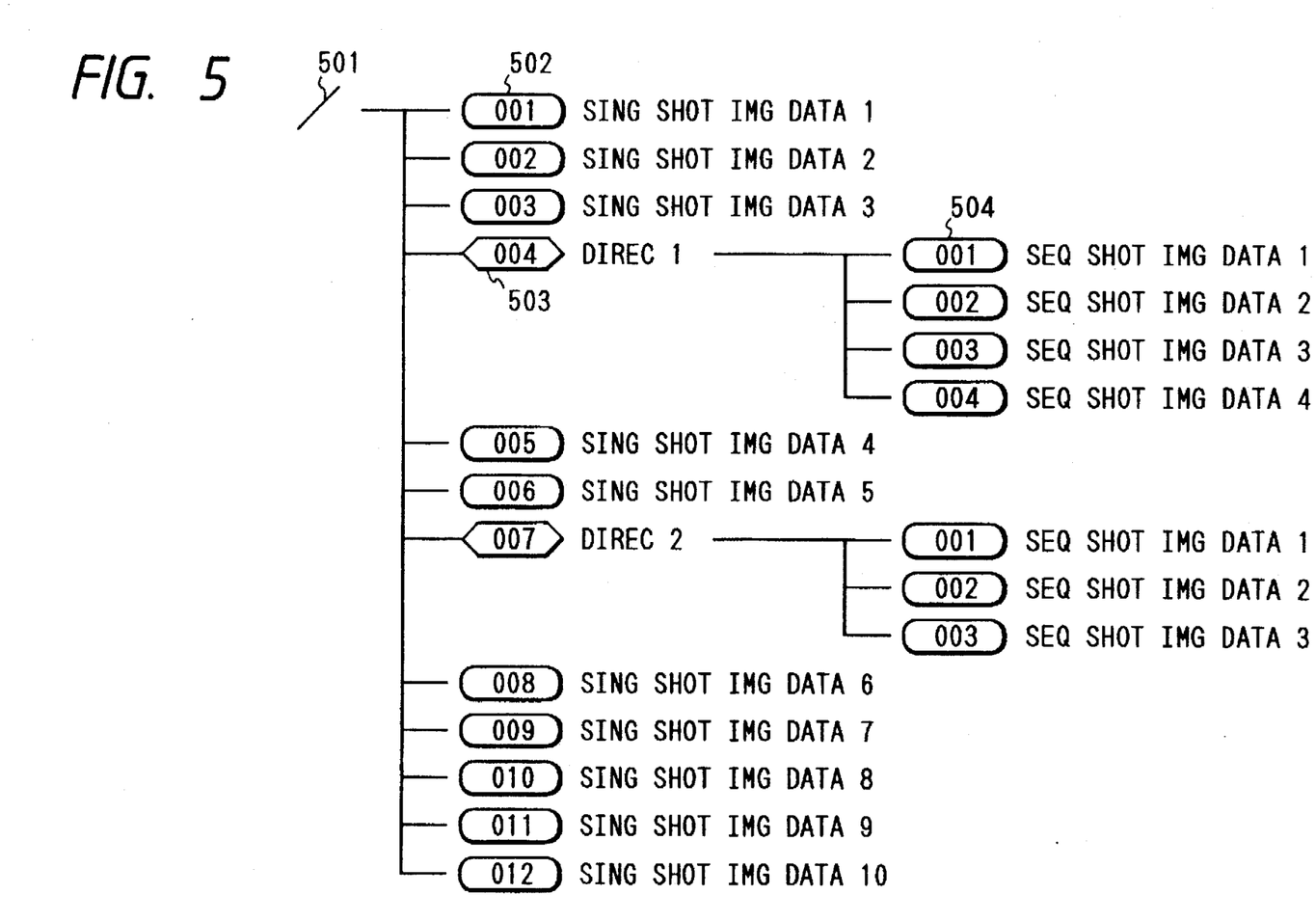
FIG. 5 is a conceptual diagram showing the file structure of the image data recording method in the digital still video camera according to a fourth embodiment of the present invention.

FIG. 5 shows a fourth embodiment of the file structure of the image data recording method in the digital still video camera according to the present invention.

In FIG. 5, the reference numeral 501 designates a root directory, and the reference numeral 502 denotes an example of the file names of single shot image data. The reference numeral 503 designates the directory name of a subdirectory made under the root directory. The directory name of the subdirectory is comprised of consecutive numbers of three figures. In this embodiment, the file of single shot image data is made under the root directory and the file of sequential shot image data is made under the subdirectory made under the root directory, whereby the single shot image data and the sequential shot image data are distinguished from each other. Also, both of the file names of the single shot image data and the subdirectory name in which the sequential shot image data are stored are comprised of consecutive numbers of three figures.

Figure 7:
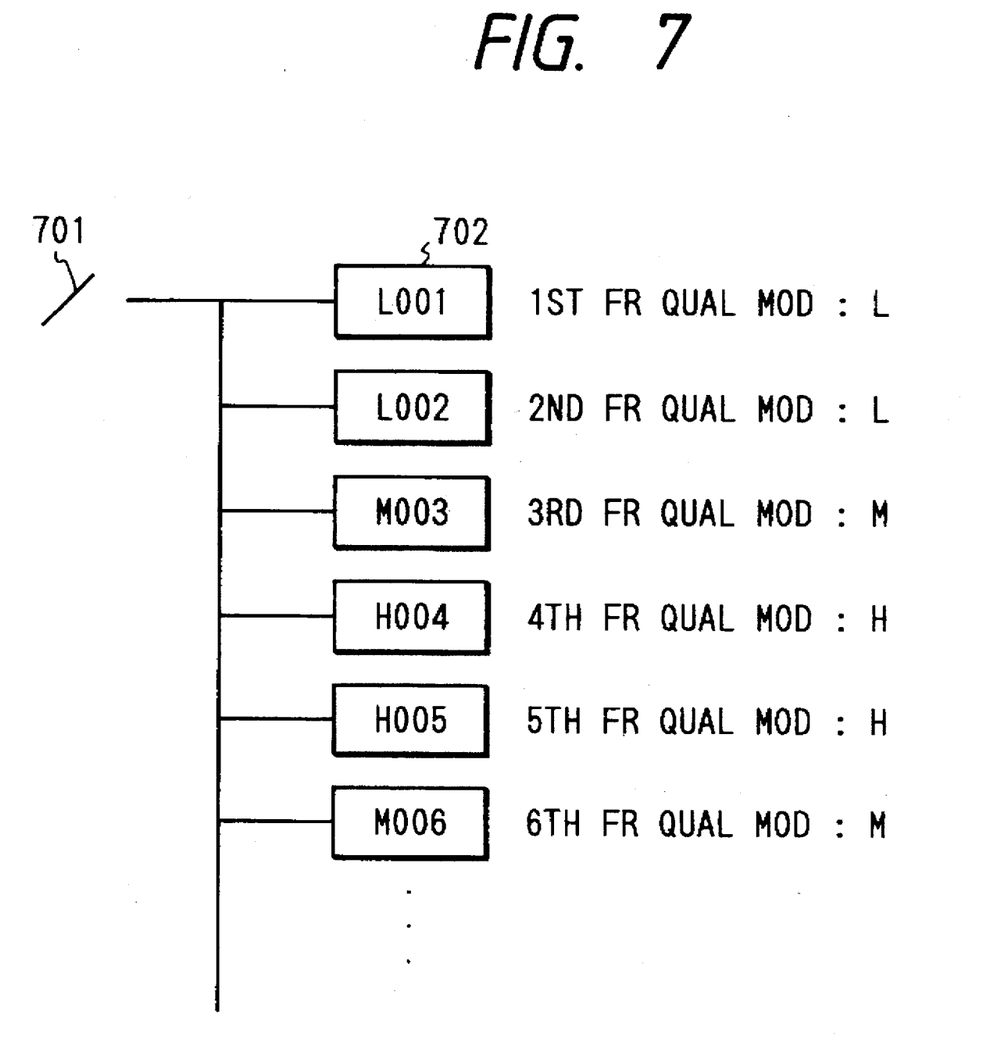
FIG. 7 is a conceptual diagram showing the file structure of the image data recording method in the digital still video camera according to a fifth embodiment of the present invention.

FIG. 7 shows a fifth embodiment of the file structure of the image data recording method in the digital still video camera according to the present invention.

In FIG. 7, the reference numeral 701 denotes a root directory, and the reference numeral 702 designates an example of the file names of image data. The file names are comprised of a character L, M or H and consecutive numbers of three figures. A character L, M or H represents the compression rate (quality mode) of image data recorded. For example, L represents that the compression rate is 1/10, M represents that the compression rate is 1/20, and H represents that the compression rate is 1/30.

As described above, a predetermined character or character row for distinguishing in what mode the image data have been recorded is included in a part of the character row of the file names and therefore, simply by searching the photographed image data with the aid of the file names, it becomes possible to find out and reproduce the image data automatically and rapidly.

Also, as compared with a method of recording a predetermined character or character row for distinguishing in what mode image data were recorded on a header unit within a file, the time for opening and closing the file becomes unnecessary and therefore, it becomes possible to find out and reproduce the image data correspondingly more rapidly.

While in the embodiments, the predetermined character or character row for distinguishing in what mode the image data were recorded is included in a part of the character rows of the file names, it is also possible to include photographing modes such as exposure mode (manual exposure or programmed exposure), multiple exposure and date and time of photographing in a part of the character rows of the file names.

A further embodiment will hereinafter be described. In this embodiment, the construction of the functional blocks of the digital still video camera is similar to that shown in the block diagram of FIG. 1, but the sequence control unit 109 has the function of counting the date and time of photographing, besides the function of controlling the series of operations of each block in conformity with various set photographing modes such as the exposure modes and image compression rate set by an operating switch, not shown. The above-mentioned exposure modes are the manual exposure mode, the aperture priority exposure mode, the shutter speed priority exposure mode, the programmed exposure mode, etc. The programmed exposure mode includes the exposure modes for shifting the program line depending on the photographing situation, such as the portrait mode, the sports mode and the close-up mode.

Figure 8:
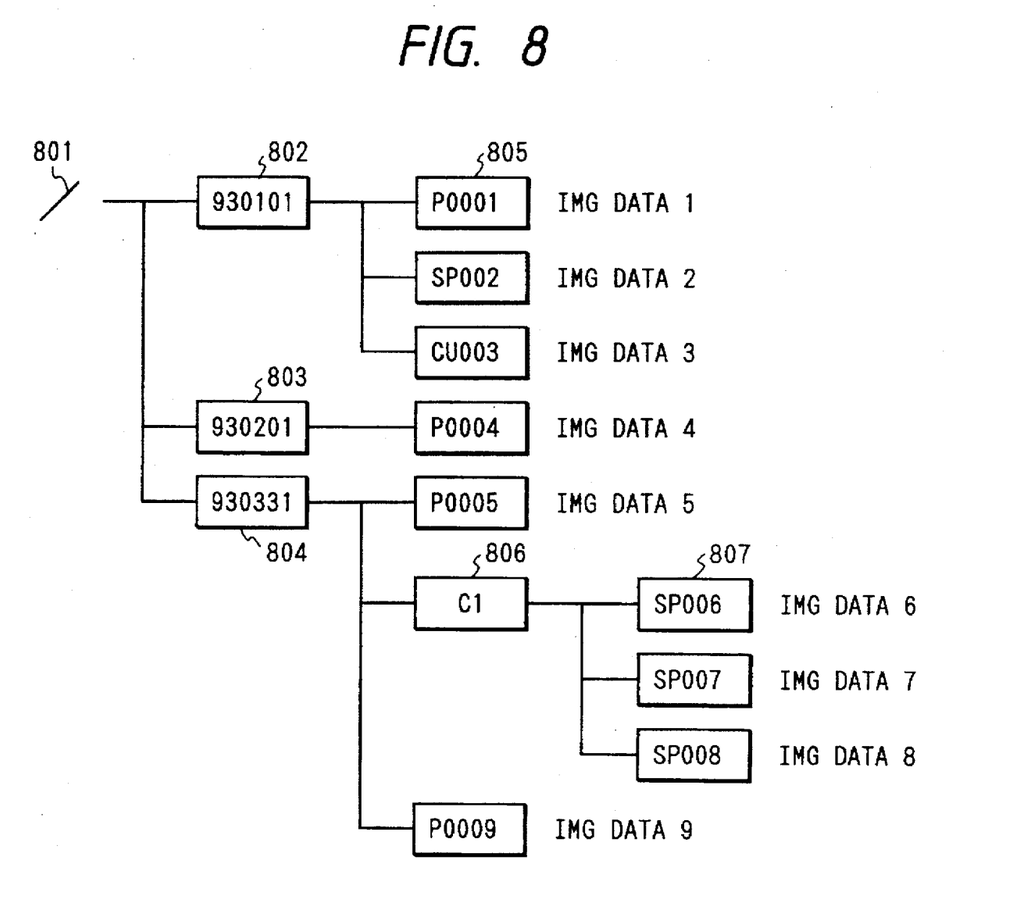
FIG. 8 is a conceptual diagram showing the file structure of the image data recording method in the digital still video camera according to a sixth embodiment of the present invention.

FIG. 8 is a conceptual diagram showing a sixth embodiment of the file structure of the image data recording method in the digital still video camera according to the present invention.

In FIG. 8, the reference numeral 801 designates a root directory, and the reference numerals 802, 803 and 804 denote the directory names of subdirectories prepared by the date of photographing under the root directory. For example, the directory name "930101" means Jan. 1, 1993. In this directory, there is stored the file of image data photographed on Jan. 1, 1993.

The reference numeral 805 designates the file names of image data stored in the subdirectories by date. For example, as regards the file name "P0001", "P0" means that the image data were photographed in the portrait mode, and "001" means the serial number of photographing. "SP" and "CU" in the other file names mean that the image data were photographed in the sports mode and the close-up mode, respectively.

The reference numeral 806 denotes the directory name of a subdirectory further prepared by being sequentially photographed under the subdirectories by date. The directory name "C1" means the first sequential shot. In this directory, there is stored the file of continuous sequential shot image data. When a sequential shot is then effected, a directory of which the directory name is "C2" is prepared under the subdirectories by date, and the file of the sequential shot image data is stored therein.

The reference numeral 807 designates the file names of sequential shot image data stored in the subdirectories for sequential shot. The meanings of these file names are similar to those of the file names 805 and therefore need not be described.

As described above, by suitably storing image data, it is possible to judge from the directory name and file name on what day the image data were photographed, whether the image data were photographed by single shot or by sequential shot, and what the photographing mode is.

For example, image data 1 is data photographed in the portrait mode on Jan. 1, 1993. It can be understood at once that image data 6 is data photographed by sequential shot in the sports mode on Mar. 31, 1993.

In the present embodiment, directories are prepared by date, i.e., at day unit, under the root directory, but directories may be prepared at hour unit and minute unit. Also, directories may further be prepared at hour unit and minute unit under the directory prepared at day unit.

Still a further embodiment will hereinafter be described.

Figure 9:
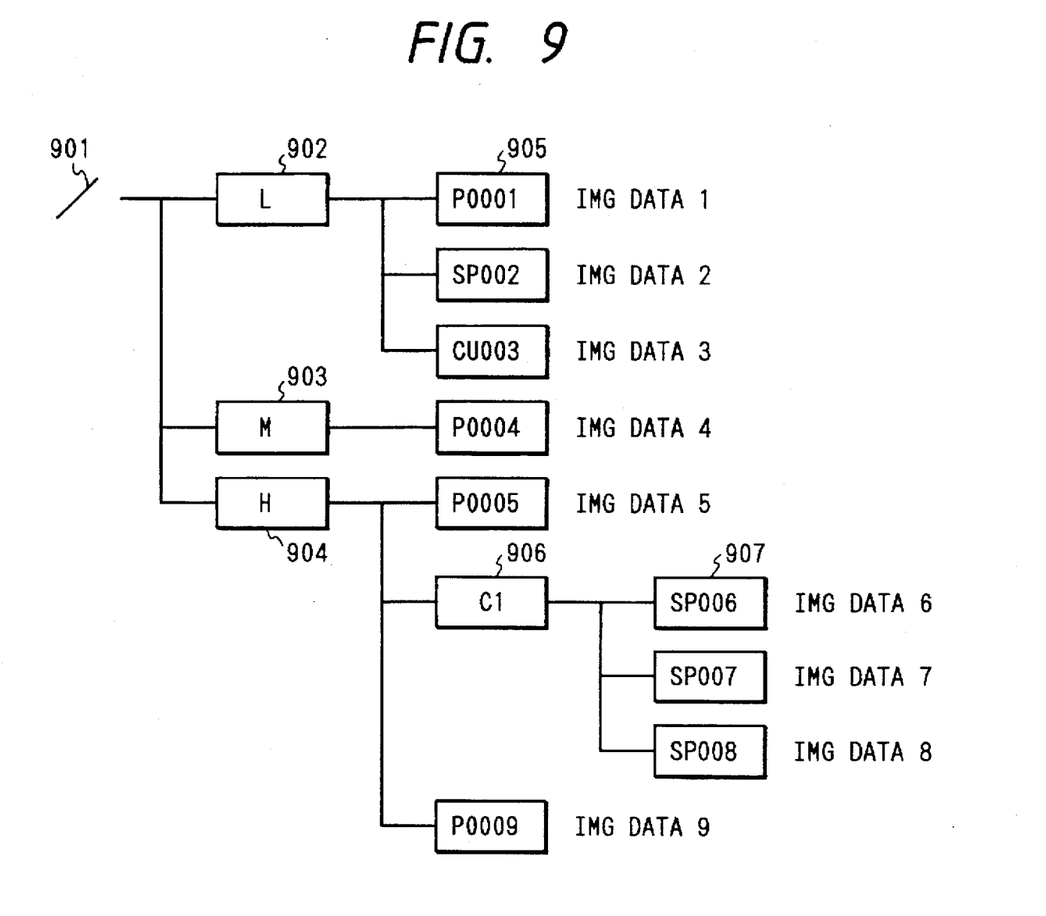
FIG. 9 is a conceptual diagram showing the file structure of the image data recording method in the digital still video camera according to a seventh embodiment of the present invention.

FIG. 9 is a conceptual diagram showing a seventh embodiment of the file structure of the image data recording method in the digital still video camera according to the present invention.

In FIG. 9, the reference numeral 901 denotes a root directory, and the reference numerals 902, 903 and 904 designate the directory names of subdirectories prepared by image compression rate under the root directory. The directory name "L" means an image compression rate L. Likewise, "M" and "H" mean image compression rates M and H, respectively. In these directories, there are stored the files of image data photographed at respective image compression rates. The image compression rates L, M and H are the same as what has been described in the fifth embodiment and therefore need not be described here.

The reference numeral 905 denotes the file names of image data stored in the subdirectories by compression rate. The meanings of the file names are similar to those in the above-described sixth embodiment and therefore need not be described.

The reference numeral 906 designates the directory name of a subdirectory further prepared by being sequentially photographed under the subdirectories by compression rate.

The reference numeral 907 denotes the file names of sequential shot image data stored in the subdirectory for sequential shot.

As described above, by storing image data, it is possible to judge from the directory name and file name at what compression rate the image data were photographed, whether the image data were photographed by single shot or by sequential shot, and what the photographing mode is.

Although in the present embodiment, image data photographed at the same image compression rate are all filed in the same directory, for example, "L1" may be given as the directory name 902, and image data photographed at the compression rate L may first be stored in "L1". Then photographing may be effected at any other compression rate than the compression rate L, and when photographing is then effected at the compression rate L, the image data may be stored not in "L1" but in another directory "L2" which is newly prepared.

As described above, according to the image data recording method in the digital still video camera of the present invention, a directory is prepared and only the file of image data photographed in at least one of a plurality of photographing modes is stored therein and therefore, the files of image data are put in order and any desired file can be found out in a moment. Also, in what photographing mode the image data were photographed can be judged.

What is claimed is:

1. An image data recording method in a digital still video camera capable of selecting one of a single shot mode for photographing and recording only a single image and a sequential shot mode for sequentially photographing and recording a plurality of images, said method comprising the steps of:

discriminating whether a respective signal of each photographed image was obtained in the single shot mode or in the sequential shot mode;

assigning a respective file name to each photographed image; and recording the file names and the signals of the photographed images in correspondence with each other;

wherein the file name assigned to the image photographed in the single shot mode is recorded at a first hierarchy level, a name representing the plurality of images photographed in the sequential shot mode is recorded at the first hierarchy level, and the respective file names of said plurality of images in the sequential shot mode are stored at a hierarchy level different from the first hierarchy level.

2. The image data recording method of claim 1, wherein the file names assigned to the images photographed in the sequential shot mode include one or more characters indicative of the order of photographing.

* * * * *